Sept. 24, 1935.  E. G. JOHANSSON  2,015,112
APPARATUS FOR MULTIPLE METER INSTALLATION
Filed Nov. 12, 1934   2 Sheets-Sheet 1
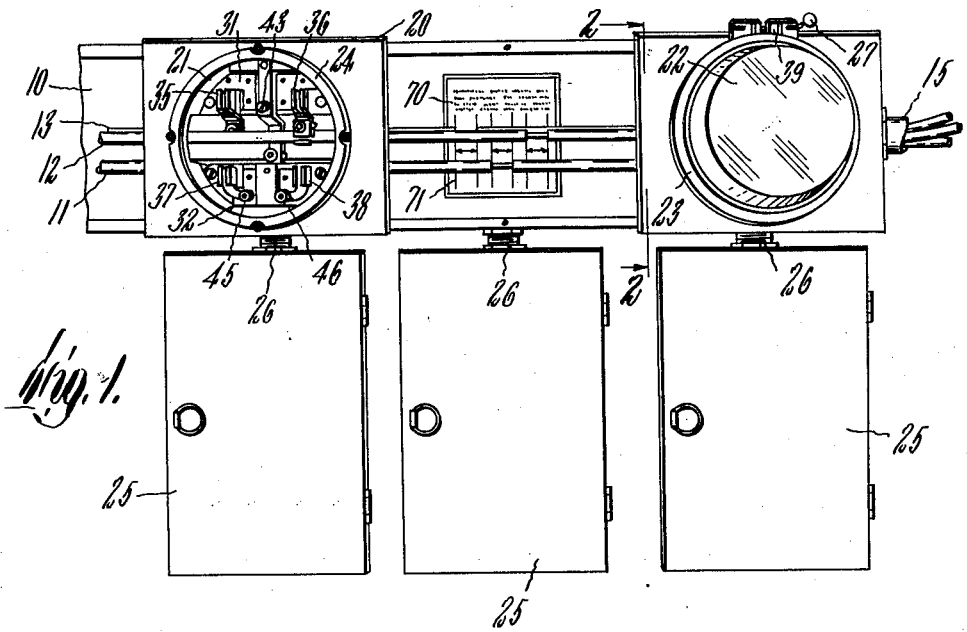
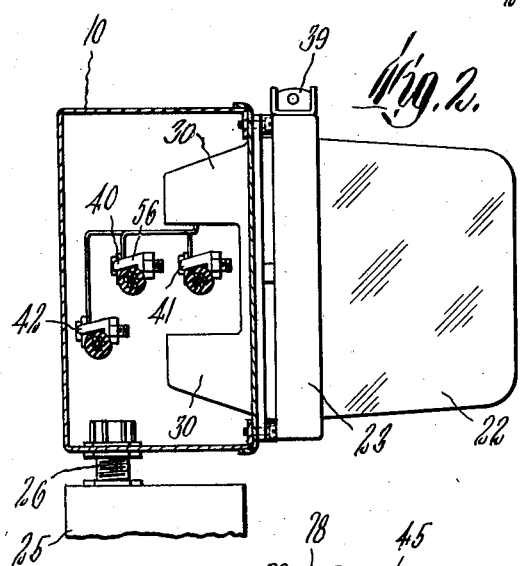
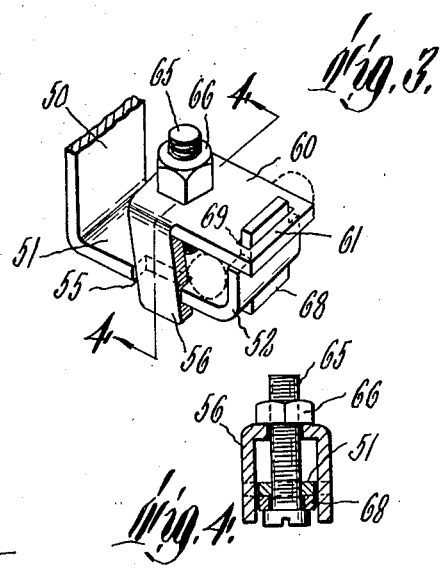
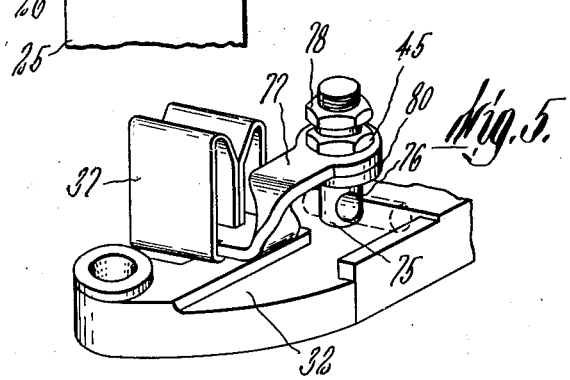
Inventor
Ernest G. Johansson
by Wright, Brown, Quinby & May
Attys.

Sept. 24, 1935.  E. G. JOHANSSON  2,015,112
APPARATUS FOR MULTIPLE METER INSTALLATION
Filed Nov. 12, 1934  2 Sheets-Sheet 2
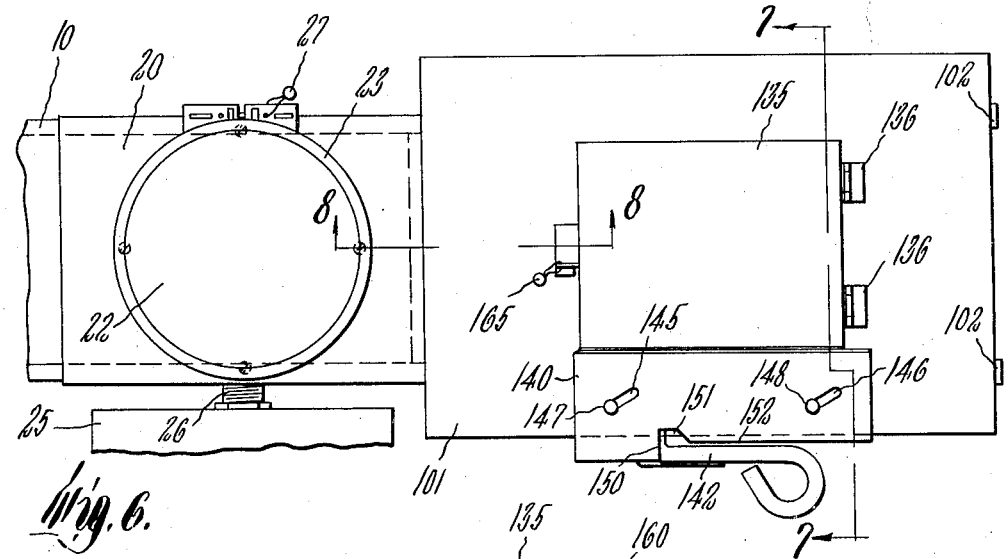
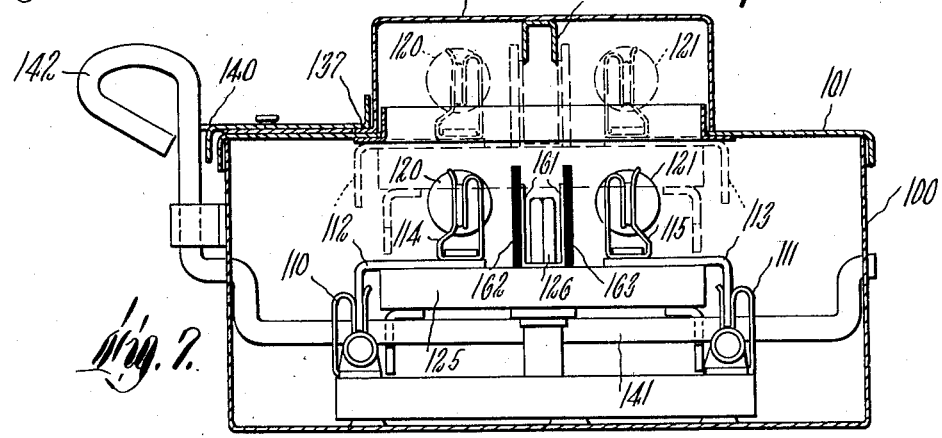
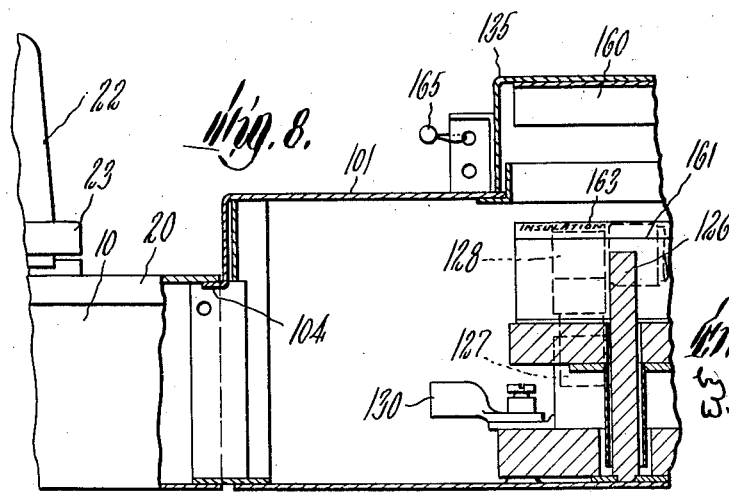

Patented Sept. 24, 1935

2,015,112

UNITED STATES PATENT OFFICE 2,015,112

APPARATUS FOR MULTIPLE METER INSTALLATION

Ernest G. Johansson, Watertown, Mass., assignor to The Palmer Electric & Manufacturing Co., Waltham, Mass., a corporation of Massachusetts Application November 12, 1934, Serial No. 752,668

2 Claims. (Cl. 247—2)

This invention relates to apparatus for a multiple meter installation such as may be found in buildings having more than one tenant. In order to facilitate the reading of meters in buildings where there are several tenants each having a separate meter, it is customary to locate the meters in one place rather than to scatter them throughout the building. In order to economize space, the meters are frequently arranged side by side as close as possible. The present invention relates to improved apparatus for receiving and supporting removable meters and for housing the service wires and the connections between these wires and the meters.

According to existing fire codes, the service wires entering a building must be of considerable diameter, exclusive of insulation, so as to carry safely the maximum current which may at any time be required by all of the consumers in the building. Wires of such size are comparatively stiff. It is necessary for practical reasons to protect these service wires against unauthorized tampering so as to prevent possible short-circuiting or the theft of current. For similar reasons, it is likewise necessary to enclose all of the connections through the meter to each service switch. The present invention has for one of its objects the provision of convenient apparatus for housing and protecting the service wires and connections and for facilitating the installation of such connections.

For a more complete understanding of the invention, reference may be had to a disclosure of an embodiment thereof in the description which follows, and on the drawings of which,—

Figure 1 is a perspective view of apparatus including an embodiment of the invention.

Figure 2 is a section on the line 2—2 of Figure 1.

Figure 3 is a perspective view of an improved terminal clamp for making connections with a service wire.

Figure 4 is a section on the line 4—4 of Figure 3.

Figure 5 is a perspective view of a meter connection element having a swivel terminal element connected thereto.

Figure 6 is an elevation of a portion of a trough having a control switch box attached thereto.

Figure 7 is a section on the line 7—7 of Figure 6.

Figure 8 is a section on the line 8—8 of Figure 6.

The structure illustrated in Figures 1 and 2 may comprise a trough 10 of sufficient width and depth to accommodate service wires 11, 12 and 13, and apparatus for connecting the service wires with meters. These troughs may be made in standard lengths to accommodate two or more meters, and are made with knockouts in the sides and ends for conduit or cable fittings. Open-ended sections of trough may also be joined end-to-end to construct sectional troughs accommodating any desired number of meters. Each trough when installed is closed at its ends, and a conduit 15 is connected to one end to admit the service wires into the trough. On the top or open side of the trough is secured a sufficient number of cover plates 20 to cover the entire top of the trough. These cover plates are made with a suitable opening, preferably circular, to receive a ring socket 21. As hereinafter described, each ring socket carries connecting apparatus for a meter adapted to fit on the ring socket and thus to close the opening therethrough. In Figures 1 and 2 the casing of a meter is indicated at 22. In the illustration of the trough 10 in Figure 1, only two cover plates 20 are shown, the other plate being left off to show the interior of the trough. It will be understood that in actual practice a sufficient number of cover plates 20 will be secured to the top of the trough to form a cover for the trough which is continuous except for the openings through the sockets 21. These openings are, in turn, closed either by meter casings 22 or by circular cover plates (not shown), each meter or cover plate being secured to its socket by a suitable flanged band 23 which passes around the base of the meter or plate and engages under a flange 24 on the ring 21, the ends of the band being sealed together as by a seal 27. Thus, when the apparatus is completely assembled, the service wires within the trough are completely enclosed and protected against tampering.

The trough may be mounted against a wall horizontally as indicated in Figure 1, a switch box 25 (preferably fused) being mounted below each ring socket 21 and connected to the trough as by a conduit connection 26. The switches and the fuse holders in the boxes 25 may be of any approved construction. The load wires for the several consumers lead from the respective switch boxes 25. If the shape of the space available for the meter installation is longer vertically than horizontally, the trough 10 may be installed in a vertical position, the box 25 being mounted on either side of the trough.

The function of the socket 21 is to support suitable connecting means by which the service wires may be connected through an easily detachable meter to the trough switch in a box 25. As shown, the ring socket 21 may comprise a ring adapted to rest against the outer face of a cover plate 20, this ring having four legs 30 projecting inward into the trough and terminating in feet on which are secured a pair of supports or platforms 31 and 32 of insulating material. Mounted on the platform 31 are a pair of resilient connectors 35 and 36 adapted to receive connecting blades of a meter. Similar resilient connecting elements 37 and 38 are mounted on the other platform 32 to receive connecting blades on a meter. Thus, in mounting a meter on a ring socket 21, it is necessary only to push the meter into place, the four connecting blades thereof entering the resilient connecting elements 35, 36, 37 and 38. One of these resilient elements, such as 37, is clearly illustrated in Figure 5. When the meter is seated against the ring 21, it is secured thereon as by a circular band 23 having inward flanges engaging annular shoulders on the meter casing 22 and the socket ring 21, respectively. The ends of the band 23 are pulled together by a device 39 which is sealed when the band is tight.

In order to connect the elements 35, 36 with respective service wires 13 and 12, I provide terminals of the bus type such as are illustrated in Figures 1 and 2. For convenience in making connections between these terminals and the respective wires, the terminals are mounted at different levels so that it will not be necessary to bend any of the service wires. For example, as indicated in Figures 1 and 2, the connector 35 may be connected with a terminal element 40 projecting down further from the platform 31 than a terminal 41 connected to the element 36. In a three-wire system such as illustrated in Figure 1, the neutral wire may be connected to a terminal 42 which is at a still lower level than the other terminals. The conductor carrying the terminal 42 is provided with a binding post 43 for a wire which leads into the corresponding switch box 25 as will be understood by one skilled in the art. The meter connecting elements 37 and 38 are provided with binding posts 45 and 46 for wires leading into the corresponding switch box 25.

The terminals 40, 41 and 42 may be of any preferred construction, such, for example, as that illustrated in Figure 3. For convenience, the terminal shown in Figure 3 is described, as shown therein, in an upright position. It is evident that in actual use it may assume any desired position. The terminal may be supported by and comprise a portion of a heavy strip of copper 50 bent to form a horizontal portion 51 and an upright end portion 52. The horizontal portion 51 is provided with a notch 55 on each side to receive a downwardly extending leg 56 of a clamping element 60. This element is in the shape of an inverted U, the upper transverse portion having a lateral extension 61 projecting toward the tip of the end portion 52 of the strip 50. A threaded bolt 65 projecting upwardly through the horizontal portion 51, midway between the notches 55, and extends upwardly through a perforation in the transverse upper portion of the element 60 to receive a nut 66. The bolt 65 is preferably made of sufficient length so that the nut 66 can be backed off toward the end thereof a sufficient distance to permit the insertion of the stripped portion of a service wire between the ends of the clamping elements 52 and 61 without the removal of the nut from the bolt. Thus the connection can be made without danger of dropping the nut 66 or the clamping element 60 into the bottom of the trough where they would be difficult to retrieve when the ring sockets 21 are in place. After a service wire has been inserted in the terminal as indicated in Figure 3, the nut 66 can be set up so as to clamp the wire between the extension 61 and the horizontal portion 51 of the strip 50. It has been found by experience that in the terminal clamp consisting of two elements threaded by a bolt and pressed together by a nut to grip the wire, there is a tendency on the part of the gripping elements to spring away from each other. Thus, in the structure illustrated in Figure 3, there is a tendency on the part of the member 52 to spring outwardly, and for the horizontal element 51 to bend where it is weakened by the notches 55 and the perforation through which the bolt 65 passes. I may reinforce the element 51 by a stiffening element 68 immediately below it, or by projecting the end portion of the member 52 through a slot in the extension 61, or by both. There is also a tendency on the part of the extension 61 to spring upwardly and to tilt the bolt 65 rearwardly. To counteract this effect, the legs 56 are inclined forwardly and downwardly with respect to the plane of the extension 61, as clearly indicated in Figure 2. The notches 55 are so made that only a slight clearance is allowed between the ends of each notch and side edges of the corresponding leg 56 which slides therein. As the nut 66 is set up, forcing the yoke 60 downward against the wire to be clamped, the legs 56 have a camming effect tending to press the bolt 65 forward. On the other hand, the reaction pressure of the clamped wire on the extension 61 tends to tilt the entire yoke 60 rearward. This rearward tilt of the yoke 60 causes the legs 56 to bind tightly against the ends of the notches 55, so that, when the nut 66 has been set up sufficiently to clamp the wire between the extension 61 and the portion 51 of the terminal, the yoke 60 is firmly jammed in place against the bolt 65 and the ends of the notches 55. Thus, even if the nut 66 should work loose or be removed, the wire will remain tightly jammed in the terminal and be released only by forcibly dislodging the yoke 60 from its jammed position.

When the apparatus is initially installed in a building, a trough 10, of sufficient length to accommodate the desired number of meters for the various tenants or consumers in the building, is mounted horizontally as shown in Figure 1, or vertically against a suitable wall or other support. The trough is connected at one end to the conduit 15 through which the service cables are led into the trough. These cables are extended to the further end of the trough. The cover plates 20 are then secured to the trough so as to cover the entire open side of the same. The circular openings in these cover plates are of sufficient size to permit ready access to the service wires in the trough for the purpose of stripping the insulation from portions thereof so that the stripped portions of the wires can be gripped by the terminal clamps 40, 41 and 42. As is evident from Figure 1, the platforms 31 and 32 and the terminals 40, 41 and 42 partially obstruct the opening in the cover plate 20 so that access to the service wires, when the ring sockets 21 are in place, is very limited. Thus it would be extremely difficult to strip insulation from the wires after the socket rings 21 have been placed in position. It is of great importance that, when the insulation is stripped from portions of the service wires, only such portions will be stripped as will be directly clamped by one or another of the terminals 40, 41 or 42. Thus it is highly desirable that at each point of connection the exact amount of insulation be removed at exactly the right place so that the stripped portions will register accurately with the terminals when the ring sockets 21 are installed. Since it is practically impossible to strip the insulation after the ring sockets are installed, this must be done before the sockets are in place. In order to facilitate correct stripping of insulation from the wires, suitable guiding indicia are provided on the bottom or rear wall of the trough opposite the opening of each cover plate 20. These indicia may be in the form of a suitable label 70 having marks 71 printed thereon to serve as guides to show where the insulation on the cables should be cut so that the stripped portions will register accurately with the terminals supported by the ring socket. The labels 70 may also carry printed directions indicating which of the service wires correspond to the several guide marks in cases of two-wire and three-wire systems. Thus the wires may be conveniently stripped before the installation of the ring sockets, the stripped portions being accurately located so as to register exactly with the terminals 40, 41 and 42. After the sockets 21 have been secured in place, the cables are then brought into clamped engagement with the respective terminals, these terminals being set up tightly to make good electrical connections with the service wires. Connecting wires (not shown) are then led from the binding posts 43, 45 and 46 into the corresponding switch box 25 where they are connected to the switch or fuse holders in a manner well known in the art.

The binding posts 45, 46 are preferably of the type illustrated in Figure 5, comprising a stem 75 having a hole 76 therethrough of a size adapted to receive the end of one of the wires leading into the switch box 25. The stem 75 projects through a perforation in a conductor 77 which leads from the meter terminal 37 and is in threaded engagement with a suitable nut 78 which bears on the upper face of the end portion of the conductor 77. A suitable washer 80 is mounted on the stem 75 below the conductor 77. When the end of a wire has been thrust into the hole 76, the nut 78 is set up, drawing the stem upwardly until the wire is pressed tightly against the washer 80. This results in a tight electrical connection between the conductor 77 and the wire entering the hole 76. When the nut 78 is loose, the stem 75 can be turned on its axis so that the hole 76 may be turned in any direction convenient to receive the end of a wire. This swivel construction of the binding post is useful in the present instance to adapt the fitting which includes the meter connector 37, the conductor 77, and the binding post 45, since it can be mounted as shown in Figure 1 or can be mounted in a position at right angles thereto in case the trough is installed in a vertical position. It is evident that the meter should be installed in an upright position and that the connections 35, 36, 37 and 38 must be adjusted accordingly so as to receive the blade connectors of the meter when the meter is in its upright position. If the binding posts receive wires from the switch box 25 in one direction when the connecting elements are installed as shown in Figure 1, they will receive the wires from a considerably different direction if the connections are installed in a vertical trough. The swivel construction of the binding posts 45 and 46 permits easy adjustment of the direction of the holes 76 to the direction of approach of the corresponding wires.

In many localities the underwriters' rules require that, when more than a specified number of meters are connected to the line wires entering a building, a fused master switch must be interposed between the incoming line wires and the meters. The master switch and the fuses are enclosed in a metal box which is customarily sealed to prevent unauthorized access to live, unmetered terminals. Since, however, the possibility of a fuse blowing in the box provides a reasonable excuse for obtaining access to the fuses, switches and boxes have been devised with cooperating mechanism such that the terminals of the switches are accessible only when they are dead. Such mechanism, however, is not sufficient to prevent the theft of current from a three-wire system by the removal of one of the fuses and the use of a jumper, the latter being attached to certain fuse terminals and left in place when the box is closed to connect fuses with the live terminals of the line. While the box must be constructed to prevent, as far as possible, unauthorized access to the interior thereof, it must be made accessible to authorized employees of the service company. To this end, switch boxes are usually made with removable covers which are secured by a seal. Such seals, however are liable to be broken by unauthorized individuals under the plea of necessary access to the fuses without understanding the mechanism for exposing the fuses for replacement. In order to make more difficult unauthorized access to the interior of the box for theft of unmetered current the present invention includes structure by which the cover of the box cannot be opened except after considerable disassembly of the trough structure. It is also an object of the invention to provide means for severing a jumper automatically before the fuses can be moved into contact with live terminals. Mechanism for these purposes is illustrated in Figures 6, 7 and 8 of the drawings.

As shown, the trough 10 may have a switch box 100 secured to an end thereof, this box having a suitable opening through one end registering with the adjacent end of the trough 10. The box is provided with a cover 101 hinged thereto as at 102, the hinges being at the end remote from the trough so that the end adjacent to the trough swings away from the body of the box. As indicated in Figure 8, the end of the cover adjacent to the trough 10 is provided with a flange or lip 104 which is adapted to engage under the edge of the cover plate 20. As hereinbefore described, the cover plates 20 are secured to the trough by fastening elements which are covered by ring sockets 21 and a meter 22 or a blank cover plate, secured in place by a flanged band 23. The ends of the band are drawn together and secured by a suitable seal 27. With such structure, accidental access to the interior of the switch box 100 by the mere breaking of a seal is impossible, since, in order to open the cover 101, it is necessary not only to break the seal 27 but to remove the band 23, the meter or cover plate secured thereby, the ring socket 21, and the plate 20. This effectually prevents inadvertent unauthorized opening of the box cover 101.

The switching mechanism within the box is preferably of some construction such as will render all of the fuse terminals dead before they can be made accessible. Mechanism of this kind is illustrated in Figure 7 which shows line terminals 110 and 111 which are connected as by conductors 112 and 113 to a pair of fuse terminals 114 and 115. The latter terminals are live terminals when the conductors 112 and 113 are in contact with the line terminals 110 and 111. The fuses 120 and 121, together with their terminals and the conductors 112 and 113 are mounted on a vertically movable platform 125, this platform being slidable on a pair of vertical guide posts 126. At the further end of the platform 125 a pair of conductors 127 connect the fuse terminals 128 at the opposite ends of the fuses to load terminals 130. It is evident from Figure 7 that, if the movable platform 125 is elevated from the position shown in full lines to that shown in dotted lines, the fuses are completely disconnected from both the line terminals and the load terminals. Thus all of the fuse terminals are dead when the fuses are elevated as indicated by dotted lines in Figure 7. The cover 101 is provided with a central opening directly above the platform 125, this opening being of sufficient size to permit the fuses and their supporting terminals to emerge. A closure is provided for this opening in the form of a deep cover 135 hinged as at 136 to the cover 101. The cover 135 is provided with a lateral flange 137 which engages the top surface of the cover 101 when the cover 135 is closed. A locking plate 140 is adapted to overlap the flange 137 so as to prevent the opening of the cover 135 except when the platform 125 with the fuses is in its elevated position. Suitable mechanism is provided for elevating and lowering the platform 125. Such mechanism may include a crank bar 141 journaled in the sides of the box 100 and operated by a crank handle 142 outside of the box. This handle is arranged to cooperate with the locking plate 140 so that the plate overlaps the flange 137 of the cover 135 when the platform 125 is in its lowered position, and moves clear of the flange 137 when the platform 125 is in its raised position. To this end, the plate 140 is provided with a pair of diagonal slots 145, 146 through which project a pair of pins 147, 148. The outer edge of the plate 140 is notched so as to provide a shoulder 150 in the path of the handle 142, a recess 151, and an edge portion 152 normally adjacent to the path of movement of the operating handle 142. The operation of the locking mechanism is evident from Figure 6. This figure shows the switch-operating mechanism in its closed position. In order to open the switch, the handle 142 is swung to the left. This causes the handle to engage the shoulder 150 of the plate 140, moving the plate to the left. The diagonal slots 145 and 146 cause the plate to move outwardly as well as to the left so that the plate is thus moved clear of the flange 137, the notch 151 preventing interference between the edge of the plate and the handle 142. In this manner the cover 135 can be opened manually for access to the fuses 120, 121, all of the terminals of the fuses being dead at such time.

When it is desired to close the main switch, the cover 135 must be closed before the plate 140 can be moved toward the right, this being due to the fact that the flange 137 engages the inner edge of the plate 140 when the cover 135 is open. After the cover 135 has been closed, the plate 140 can move inwardly over the flange 137. This is done by swinging the handle 142 toward the right. The handle engages the sides of the notch opposite the shoulder 150 so as to move the plate toward the right until the plate moves far enough in for the handle to clear the notch and rub along the edge 152 of the plate. Thus closing movement of the switch handle is possible only when the cover 135 is in its closed position, and locks the cover 135 in such position.

In order to avoid the use of jumpers within the switch box when the latter is closed, I provide shearing mechanism which may comprise a channel member 160 secured to the under face of the cover 135 and extending substantially from one end to the other thereof. The depending edges of this channel member are sharpened and are adapted to engage the upstanding edges of a channel member 161 mounted on the platform 125. In order to protect the member 161, which is preferably made of steel, from the fuse terminals, I may mount a pair of insulating plates 162, 163 between the member 161 and the adjacent fuse terminals. As indicated in Figure 7, when the cover 135 is moved to its closed position, which movement must take place before the platform can be lowered from the elevated position shown in dotted lines, the members 160 and 161 act as shears to sever any jumpers which may have been connected across fuse terminals when the cover 135 was opened. The shears thus tend to prevent the theft of current by the use of jumpers across fuse terminals. In addition to the interlocking mechanism which prevents opening of the cover 135 until the platform 125 has been elevated to disconnect the fuses from the line and load terminals and to block the opening in the cover 101, the cover 135 may also be secured by a seal 165 which must be broken before the cover can be opened.

It is evident that many modifications and changes may be made in the details of structure shown and described without departing from the spirit or scope of the invention as defined in the following claims.

I claim:—

1. In a trough for insulated service wires, for use with a cover with a plurality of openings large enough to permit free access to service wires therein and having electrical apparatus including wire-clamping terminals removably mounted in each said opening in a predetermined location, means including indicia permanently associated with said trough as a part of the manufacturing operation for indicating, when said apparatus is not in said predetermined location in said trough, the portions of insulation to be stripped from said wires so that the stripped portions register with said terminals when replaced in said predetermined location in said trough.

2. Electrical apparatus comprising a trough having an open side, cover means upon and partially closing said open side, said cover means having an opening permitting ready access to the interior of the trough, meter-connecting devices each removably mounted in a predetermined location in the opening of said cover and hindering access to the interior of the trough when so mounted, said devices including a plurality of wire-clamping terminals adapted to be clamped to service wires extending through the trough, and means permanently associated with said trough as a part of the manufacturing operation for indicating, when said devices are not in said predetermined locations, the portions of insulations to be stripped from said wires so that the stripped portions register with said terminals when said devices are replaced in said predetermined locations in said trough.

ERNEST G. JOHANSSON.